United States Patent
Ernst (10) Patent No.: US 11,383,685 B2
(45) Date of Patent: Jul. 12, 2022

(54) METHOD FOR OPERATING AN ASSISTANCE SYSTEM OF A MOTOR VEHICLE

(71) Applicant: AUDI AG, Ingolstadt (DE)

(72) Inventor: Herbert Ernst, Ingolstadt (DE)

(73) Assignee: AUDI AG, Ingolstadt (DE)

( * ) Notice: Subject to any disclaimer, the term of this patent is extended or adjusted under 35 U.S.C. 154(b) by 370 days.

(21) Appl. No.: 16/547,881

(22) Filed: Aug. 22, 2019

(65) Prior Publication Data

US 2020/0079334 A1   Mar. 12, 2020

(30) Foreign Application Priority Data

Sep. 12, 2018 (DE) ..................... 10 2018 215 476.7

(51) Int. Cl.
*B60T 8/1761* (2006.01)
*B60T 17/22* (2006.01)

(52) U.S. Cl.
CPC ............ *B60T 8/1761* (2013.01); *B60T 17/22* (2013.01); *B60T 2250/03* (2013.01); *B60T 2270/10* (2013.01)

(58) Field of Classification Search
CPC .............................. B60T 17/22; B60T 8/1761
See application file for complete search history.

(56) References Cited

U.S. PATENT DOCUMENTS

| | | | |
|---|---|---|---|
| 2004/0162650 A1* | 8/2004 | Kueperkoch | B60G 17/0185 701/29.2 |
| 2016/0311419 A1* | 10/2016 | Joyce | G05D 1/0077 |
| 2017/0341630 A1 | 11/2017 | Zipfel et al. | |
| 2019/0375384 A1* | 12/2019 | Cho | B60T 8/885 |

FOREIGN PATENT DOCUMENTS

| | | |
|---|---|---|
| CN | 103338987 A | 10/2013 |
| CN | 105292086 A | 2/2016 |
| CN | 105722735 A | 6/2016 |
| DE | 3611822 A1 | 10/1986 |
| DE | 101 07 455 A1 | 1/2002 |
| DE | 103 59 875 A1 | 7/2005 |
| DE | 10 2011 078 118 A1 | 12/2011 |
| DE | 10 2015 110 965 A1 | 1/2016 |
| DE | 10 2014 221 901 A1 | 4/2016 |
| DE | 10 2016 201 261 A1 | 7/2016 |

(Continued)

OTHER PUBLICATIONS

Extended European Search Report dated Jan. 23, 2020, in connection with corresponding EP Application No. 19190483.8 (14 pgs., including machine-generated English translation).

(Continued)

*Primary Examiner* — Imran K Mustafa
(74) *Attorney, Agent, or Firm* — Maier & Maier, PLLC (57) ABSTRACT

A method for operating an assistance system of a motor vehicle, with a first control unit and with a second control unit, wherein a first rotational speed sensor is connected to the first control unit for recording a rotational speed of a first wheel, wherein a second rotational speed sensor is connected to the second control unit for recording a rotational speed of a second wheel, and wherein the first control unit is coupled to the second control unit using signal technology.

20 Claims, 1 Drawing Sheet

(56) References Cited

FOREIGN PATENT DOCUMENTS

DE    10 2015 209 565 A1    12/2016
EP           3 379 669 A2     8/1990
EP           1 219 489 A2     7/2002

OTHER PUBLICATIONS

Chinese Office Action dated Jun. 11, 2021, in connection with corresponding CN Application No. 201910852844.1 (16 pgs., including machine-generated English translation).
Examination Report dated Jun. 26, 2019, in corresponding German application No. 10 2018 215 476.7; 18 pages.

* cited by examiner

METHOD FOR OPERATING AN ASSISTANCE SYSTEM OF A MOTOR VEHICLE

FIELD

The invention relates to a method for operating an assistance system of a motor vehicle. The invention further relates to an assistance system of a motor vehicle and a motor vehicle.

BACKGROUND

Motor vehicles typically have braking systems, by means of which a deceleration of the motor vehicle takes place. In this process, a brake disc is typically indirectly attached to a wheel of the motor vehicle in a rotatable manner. Upon a braking request from the driver, brake pads are moved against the brake disc and thus a friction is increased, which reduces the rotational speed of the wheel. The braking request from the driver is typically recorded by means of a brake pedal, which is typically hydromechanically connected to the brake pads. In addition, a brake booster is usually present so that, in order to achieve a specific braking effect, the brake pedal must only be actuated with a comparably light force.

With an excessive application of force, it is possible for the wheel to lock, which worsens a braking effect. A targeted influencing of a direction of movement of the motor vehicle is usually no longer possible in this case as well. In order to prevent this, there are anti-lock braking systems known for example, in which the braking force is reduced briefly so that the wheel can be released for a brief time. To do this, it is necessary for the wheel slip of the wheel to be recorded first. To do this, a rotational speed sensor is typically assigned to each of the wheels of the motor vehicle, and the sensor signals, which are recorded by means of the rotational speed sensors, are evaluated with a common control unit.

If this system fails, it is still possible for the driver of the motor vehicle to diminish the braking force as well, with manual operation, by means of targeted change of the position of the brake pedal so that locking is suspended. However, if the motor vehicle is to be moved automatically, a redundant design is necessary to monitor the wheel slip. With such type of redundant design, thus eight sensors and two control units would be necessary, which increases the cabling expense and the required installation space. The weight and production costs are also increased.

SUMMARY

The object of the invention is to indicate an especially suitable method for operating an assistance system of a motor vehicle as well as an especially suitable assistance system of a motor vehicle as well as an especially suitable motor vehicle, wherein advantageously safety is increased, wherein expediently production costs are decreased.

The method is used to operate an assistance system of a motor vehicle. The motor vehicle is, for example, a commercial vehicle. Especially preferably, the motor vehicle, however, is a passenger car. The motor vehicle has, for example, an internal combustion engine, an electric motor, or a combination thereof for propulsion.

The assistance system has a first control unit and a second control unit, which are structurally identical, for example, with respect to one another, such that equivalent parts can be used. Thus, production costs are reduced and storage is simplified. In addition, the assistance system preferably comprises a first rotational speed sensor and a second rotational speed sensor. The two rotational speed sensors are preferably structurally identical with respect to one another, such that, in turn, equivalent parts can be used, which reduces production costs and simplifies storage.

The first rotational speed sensor is used to record a rotational speed of a first wheel, and the second rotational speed sensor is used to record a rotational speed of a second wheel. The rotational speed sensors are suitable, especially provided and configured, to do this. In particular, the first rotational speed sensor is coupled to the first wheel, and the second rotational speed sensor is coupled to the second wheel.

For example, the recording of the respective rotational speed takes place by means of a light barrier or electromagnetically. The wheels are expediently used to establish contact of the motor vehicle with a plane, particularly ground, such as a roadway with a driving lane. If particularly one of the wheels is propelled, the motor vehicle is moved. The wheels themselves comprise, for example, multiple components, particularly a tire, a rim, and/or further components and are expediently mounted so as to rotate with respect to a body or a chassis of the motor vehicle by means of a bearing. In particular, only the first rotational speed sensor is assigned to the first wheel and only the second rotational speed sensor is assigned to the second wheel, such that only one single rotational speed sensor is assigned to each wheel, which reduces production costs.

The first rotational speed sensor is connected to the first control unit and thus coupled thereto, particularly using signal technology. Preferably in this case, there is a direct connection of the first rotational speed sensor to the control unit, for example by means of a line or a cable. Thus, a data rate for transmitting signals between the first rotational speed sensor and the first control unit is increased, and a fault of any signals transmitted via this line is substantially suppressed. Thus, safety is increased. Alternatively or especially preferably in combination with this, the second rotational speed sensor is coupled directly with the second control unit, using signal technology, by means of a further line. However, at least the second rotational speed sensor is connected to the second control unit.

As an alternative to the respective direct coupling using signal technology, particularly by means of a respectively assigned line, there is a feed of signals, for example, that takes place by means of at least one of the rotational speed sensors in a bus system, to which the first and/or second control unit is also connected. Thus, there is data transmission between the respective rotational speed sensor and the assigned control unit via the bus system. In this manner, cabling expense and thus a weight and also production costs are reduced.

Furthermore, the first control unit is coupled to the second control unit using signal technology. In other words, an exchange of data between the two control units is made possible due to the coupling using signal technology. In particular, the coupling takes place by means of a line, which is expediently only used for the coupling to signal technology. In doing so, the two control units are spaced apart from one another, for example, which increases safety. As an alternative to this, the two control units are arranged, for example, in a common housing, and the coupling takes place intrinsically, for example, preferably by means of traces of a common PC board, or the two control units are connected to one another using signal technology by means of a connector. Thus, assembly is simplified.

The assistance system is suitably a braking control system or expediently fulfills the tasks of a braking control system in the state for which it was designed. For example, the assistance system is a component of a braking control system.

The method provides that a first sensor signal is created by means of the first rotational speed sensor. The first sensor signal in this case corresponds to a rotational movement of the first wheel and is, for example, equal to the rotational speed of the first wheel, wherein said speed particularly changes over time. In other words, the first sensor signal is a signal that changes over time. A second sensor signal is also created by means of the second rotational speed sensor. The second sensor signal preferably has the same dimension as the first sensor signal and preferably corresponds to the rotational speed of the second wheel. Based on the connection of the first rotational speed sensor to the first control unit, the first sensor signal is routed to the first control unit. The second sensor signal is likewise routed to the second control unit such that the respective sensor signal stands ready in the respective control unit.

In a broad work step, it is determined whether a fault of the first control unit or of the second control unit is present. For example, a check is done, by means of the first control unit, to determine whether the second control unit is functioning in a fault-free state, and/or a check is done, by means of the second control unit, to determine whether the first control unit is functioning in a fault-free state. At a minimum however, there is a mutual check to determine whether a fault is present by means of the control units. As an alternative to this, the fault is determined by means of an additional component. In doing so, there is particularly a check to determine whether the respective sensor signal can be recorded and/or processed on the respective control unit. Expediently, there is a continuous or at least periodical check to determine whether the respective fault is present, for example, every 10 seconds, every minute, every five minutes, or every hour. As an alternative to this, there is a check for the fault preferably at least upon the start of the motor vehicle.

Provided there is no fault, the second sensor signal is routed to the first control unit by means of the second control unit such that both the first sensor signal and the second sensor signal are present in the first control unit. A wheel slip of the first wheel is determined from the first sensor signal by means of the first control unit. In particular, the first sensor signal is compared to an acceleration value of the motor vehicle, wherein the acceleration value is expediently recorded by means of a further sensor. For example, a check is carried out to determine whether the first wheel is locked, wherein the motor vehicle continues to be moved at a speed which is different from 0 (zero) km/h. Furthermore, a wheel slip of the second wheel is determined from the second sensor signal by means of the first control unit, that is particularly whether the second wheel is locked. Preferably, the possible acceleration sensor is likewise applied here. In summary, the determination of the wheel slip of each wheel takes place by means of the first control unit, wherein this takes place by means of the sensor signals directly measured for this. Because only the first control unit is used for this, the determinations of the wheel slips do not differ, which means that any systematic fault, for example due to error tolerances, occurs with both wheel slips.

The reason is that when a fault of the first control unit is present, the determination of the wheel slip is no longer possible by means of the first control unit. A routing of the first sensor signal to the second control unit is also not possible due to the fault in the first control unit. In this case, the wheel slip of the second wheel is determined from the second sensor signal by means of the second control unit. In this case, particularly the wheel slip is determined directly from the second sensor signal, wherein preferably similar routines are used as with the first control unit, provided the fault is not present. By means of the second control unit, the wheel slip of the first wheel is additionally determined, for which suitably at least the second sensor signal is used. Preferably, the wheel slip of the first wheel is calculated by means of a theoretical model or at least determined by means of a functional connection with the second sensor signal.

Because, when a fault of the second control unit is present, a routing of the second sensor signal to the first control unit is not possible such that only the first sensor signal is available in the first control unit. In other words, the second sensor signal is no longer recognized in the first control unit due to the fault in the second control unit. By means of the first control unit, the wheel slip of the first wheel is determined from the first sensor signal, wherein this preferably takes place in a manner similar to if no fault in the second control unit were present. In addition, the wheel slip of the second wheel is determined by means of the first sensor signal. A theoretical model is particularly used for this. At a minimum however, the wheel slip of the second wheel is determined by means of a functional connection to the first sensor signal.

Based on the method, a redundant determination of the respective wheel slips is enabled, wherein not all of the individual components of the assistance system have to be doubled. Thus, production costs are reduced, wherein, however, safety is increased.

Preferably, the respectively created wheel slips are used to regulate the respective wheel slip, for which suitably a setting of a brake and/or of an engine, such as an internal combustion engine or an electric motor, is changed. In particular, the assistance system is a component of a motor vehicle, which continues movement in an automated, particularly highly automated, manner. In this case for example, there is no check or influencing of a wheel slip by a driver, particularly by means of an actuation of a brake petal or a change of an actuation of a brake pedal, such that a redundant design is necessary. For example, the first control unit is designed with greater capacity than the second control unit. In normal operation, that is when there is no fault present, the determination of the wheel slip is determined by means of the first control unit, such that the wheel slip is determined in a comparatively short time. The second control unit is only used for a fault case and thus used comparatively seldomly. Consequently, it can be designed to be comparatively weaker, which reduces production costs. By means of the second control unit, particularly only a rudimentary determination/determining of the wheel slip takes place, wherein, for example, a chronological sequence of the wheel slip has greater granularity.

For example, the method is then only carried out when the motor vehicle moves, which is preferably determined by means of the possible further acceleration sensor, or by means of a GPS signal for example.

For example, to determine the wheel slip, that is to calculate the respective wheel slip by means of the other respective sensor signal, a formula is used and the wheel slip is thus calculated. Especially preferably however, the determination takes place by means of a characteristic diagram. In this manner, comparatively few hardware resources are necessary, which further reduces production costs. In addition, the time for determining the respective wheel slip is reduced, which increases safety. In particular, the characteristic diagram is adapted to the type of motor vehicle or to the respective motor vehicle itself. For example, the completion of the characteristic diagram takes place by means of a test bench when the motor vehicle is produced. The characteristic diagram is particularly two-dimensional, such that only one single wheel slip is assigned to each sensor signal. Especially preferably however, the characteristic diagram is designed to be multi-dimensional, such that the respective wheel slip is determined, in addition to the sensor signal, by means of further factors. Consequently, safety is increased.

In particular, the determination of the wheel slip takes place by means of a wheel contact force. In doing so, the wheel contact force, that is particularly the wheel load, of the respective wheel, for which the wheel slip is determined, is expediently used. In particular, a weight sensor is used for this, which is assigned to the respective wheel or at least the axle of the motor vehicle, to which the wheel is assigned. The sensor is an acceleration sensor for example. In other words, the wheel contact force for the respective wheel is initially recorded and forwarded to the respective control unit. Due to the consideration of the wheel contact force, a friction of the wheel with the ground is considered so that a determination of the wheel slip is improved. In particular, when determining the respective wheel slip with the theoretical model, particularly the equation and/or the characteristic diagram, it is assumed that the wheel, for which the wheel slip is to be determined, is subjected to the same roadway properties, the same ground properties, and/or the same roadway quality as the wheel for which the wheel slip is determined, that is particularly directly measured.

For example, to determine the wheel slip, a further parameter affecting the wheel is additionally used, which is determined particularly by means of a further sensor. Preferably, the respective wheel contact force, that is particularly the respective wheel load, is used to determine the respective wheel slip. This is expediently measured by means of a suitable sensor, for example a weight sensor, for the respective wheel or at least for an axle, which is assigned to the respective wheel. Thus, a determination of the respective wheel slip is more precise, which increases safety. In summary, a force acting on the respective wheel or at least a parameter characterizing the state of the respective wheel, namely expediently the wheel load, is additionally considered, for which the respective wheel slip is being determined.

Alternatively or especially preferably in combination with this, the determination of the wheel slip takes place as a function of a yaw rate. Thus, in the determination of the wheel slip, a consideration of a state variable the motor vehicle takes place. The yaw rate is particularly proportional to a lateral acceleration, which is caused, for example, by a skidding movement or curve driving of the motor vehicle. Especially preferably, the determination takes place as a function of a steering angle, particularly thus a turning angle of a wheel of the motor vehicle, for example of the first wheel or of the second wheel, provided a direction of movement of the motor vehicle is set by means of the respective wheel. Due to the determination of the wheel slip as a function of the steering angle, the desired driving direction of the motor vehicle is considered, particularly curve driving, which leads to different effective forces acting on the respective wheels, which thus causes a different wheel slip. Preferably, the yaw rate and the steering angle are used to determine the wheel slip, that is the desired direction of movement or a variable corresponding thereto and the actual direction of movement of the motor vehicle or a variable corresponding thereto. Thus, a comparatively precise determination of the wheel slip is enabled. Preferably, the characteristic diagram is used in this case, and the wheel slip is particularly stored as a function of the yaw rate, of the steering angle, and/or of the wheel contact force and as a function of the sensor signal, which is assigned to the other respective wheel.

For example, a first braking signal for the first wheel is created by means of the wheel slip of the first wheel. Alternatively or especially preferably in combination with this, a second braking signal for the second wheel is created by means of the wheel slip of the second wheel. Suitably, an actuation of a brake assigned to the respective wheel takes place by means of the respective braking signal. In this process, a braking signal, for example, is newly created or a previously existing braking signal is modified. In particular, a brake is engaged by means of the braking signal, such that any locking is suspended. Alternatively or in combination with this, a braking pressure is increased by means of the respective braking signal. Thus, an improved use of the coefficient of friction takes place and thus also a boosted deceleration. The assistance system in this case thus functions at least partially as an anti-lock braking system. As an alternative to this, a creation of the braking signal takes place during the acceleration of the motor vehicle such that a wheel slip is reduced. The assistance system is thus particularly a component of an acceleration skid control system. Preferably, the assistance system is a component of an electronic stability program or the wheel slip created by means of the assistance system is routed to the electronic stability program during operation. Preferably, the assistance system is a braking system or a component of a braking system. The assistance system is especially preferably used in this case in the determination of the respective wheel slip.

Especially preferably, the assistance system has a third rotational speed sensor for recording a rotational speed of a third wheel, and a fourth rotational speed sensor for recording a rotational speed of a fourth wheel. The rotational speed sensors are suitable, especially provided and configured, to do this. Preferably, all of the rotational speed sensors are structurally identical to one another, which reduces production costs. The third rotational speed sensor is connected to the first control unit and thus coupled thereto using signal technology, expediently in the same manner as the first rotational speed sensor. The fourth rotational speed sensor is connected to the second control unit and thus coupled thereto using signal technology, expediently in the same manner as the second rotational speed sensor. Preferably, the third rotational speed sensor is coupled to the third wheel, and the fourth rotational speed sensor is coupled to the fourth wheel.

During operation, a third sensor signal is created by means of the third rotational speed sensor and/or a fourth sensor signal is created by means of the fourth rotational speed sensor. Suitably in this case, the motor vehicle has only the four wheels, by means of which contact with a driving lane is created. A wheel slip of the third wheel and a wheel slip of the fourth wheel are created, that is either determined or ascertained. In particular, the wheel slip of the third wheel is created in a similar manner as the wheel slip of the first wheel, and the wheel slip of the fourth wheel is created in a similar manner as the wheel slip of the second wheel. In other words, the wheel slip of the third wheel is determined when the wheel slip of the first wheel is determined, particularly with the same control unit, and the wheel slip of the third wheel is determined when the wheel slip of the first wheel is determined, particularly with the respectively same control unit. Likewise, the wheel slip of the fourth wheel is preferably determined when the wheel slip of the second wheel is determined, expediently with the respectively same control unit. Preferably, the wheel slip of the fourth wheel is determined when the wheel slip of the second wheel is determined, preferably with the same control unit. Expediently, when there is no fault present, the fourth sensor signal is routed to the first control unit by means of the second control unit.

The assistance system a component of the motor vehicle and has a first control unit and a second control unit, which are coupled to one another using signal technology. In addition, the assistance system comprises a first rotational speed sensor and a second rotational speed sensor. The first rotational speed sensor is used to record a rotational speed of a first wheel. The first rotational speed sensor is suitable, especially provided and configured, to do this. Expediently, the first rotational speed sensor is coupled to the first wheel in the assembled state. The second rotational speed sensor is used to record a rotational speed of a second wheel and is suitable, especially provided and configured, to do this. In the assembled state, the second rotational speed sensor is expediently coupled to the second wheel.

The first rotational speed sensor is connected to the first control unit, particularly directly coupled thereto using signal technology, preferably by means of a line suitable for this. Expediently, the line is only used for coupling the first rotational speed sensor to the first control unit using signal technology. The second rotational speed sensor is connected to the second control unit and thus coupled directly thereto, particularly using signal technology. To do this, a suitable line provided explicitly for this is preferably used.

The assistance system is operated according to a method, in which a first sensor signal is created by means of the first rotational speed sensor and a second sensor signal is created by means of the second rotational speed sensor. Furthermore, it is determined whether a fault of the first control unit or of the second control unit is present. If no fault is present, the second sensor signal is routed to the first control unit by means of the second control unit, and a wheel slip of the first wheel is determined from the first sensor signal by means of the first control unit and a wheel slip of the second wheel is determined from the second sensor signal. If a fault of the first control unit is present, the wheel slip of the first wheel is determined by means of the second control unit using the second sensor signal, and the wheel slip of the second wheel is determined from the second sensor signal. If a fault of the second control unit is present, the wheel slip of the first wheel is determined from the first sensor signal by means of the first control unit, and the wheel slip of the second wheel is determined using the first sensor signal.

In particular, the method is implemented by means of the two control units. As an alternative to this, an additional control unit is present, by means of which, for example, the two control units are controlled according to the method. Preferably, the second control unit has a transmission unit, by means of which transmission of the second sensor signal takes place provided no fault is present. The transmission unit is designed, for example, as an ASIC, which reduces an incidence of error and thus increases safety.

Especially preferably, the assistance system has a third rotational speed sensor for recording a rotational speed of a third wheel. The third rotational speed sensor is suitable, particularly provided and configured, for this, and the first rotational speed sensor is expediently coupled to the third wheel. In addition, the assistance system preferably comprises a fourth rotational speed sensor for recording a rotational speed of a fourth wheel. The fourth rotational speed sensor is suitable, especially provided and configured, to do this. Preferably, the fourth rotational speed sensor is coupled to the fourth wheel. The third rotational speed sensor is connected to the first control unit, and the fourth rotational speed sensor is connected to the second control unit.

During operation, a third sensor signal is created by means of the third rotational speed sensor and a fourth sensor signal is created by means of the fourth rotational speed sensor. If no fault is present, the fourth sensor signal is routed to the first control unit by means of the second control unit, and a wheel slip of the third wheel is determined from the third sensor signal by means of the first control unit and a wheel slip of the fourth wheel is determined from the fourth sensor signal. If a fault of the first control unit is present, the slip of the first wheel is determined by means of the second control unit using the second and/or fourth sensor signal. Alternatively or in combination with this, the wheel slip of the third wheel is determined by means of the second control unit using the second and/or fourth sensor signal. In addition, the wheel slip of the fourth wheel is determined from the fourth sensor signal. If a fault of the second control unit is present, the wheel slip of the third wheel is determined from the third sensor signal by means of the first control unit, and the wheel slip of the second wheel is determined using the first sensor signal and/or the third sensor signal. Alternatively or especially preferably in combination with this, the wheel slip of the fourth wheel is determined by means of the first sensor signal and/or of the third sensor signal. Safety is further increased due to the additional rotational speed sensors.

In particular, the motor vehicle has only the four wheels, and only one single rotational speed sensor is assigned to each of the wheels, either the first, second, third, or fourth rotational speed sensor. Thus, production costs are reduced, wherein a redundancy is provided based on the two control units such that safety is increased.

For example, the first rotational speed sensor and the third rotational speed sensor are assigned to a common axle of the motor vehicle, for example the front axle or the rear axle. Thus, cabling is simplified. Suitably in this case, the second rotational speed sensor and the fourth rotational speed sensor are likewise assigned to a common axle of the motor vehicle, particularly to the complementary axle, to which the first rotational speed sensor and the third rotational speed sensor are assigned. Thus, cabling is simplified and production costs as well as weight are consequently reduced.

In an alternative to this, the first rotational speed sensor and the third rotational speed sensor are assigned to a common side of the motor vehicle, for example the driver's side or the front passenger's side. Thus, the first rotational speed sensor and the third rotational speed sensor are assigned to different axles. Especially preferably in this case, the second rotational speed sensor and the fourth rotational speed sensor are assigned to the complementary side of the motor vehicle and consequently also to different axles. Thus, in the event of failure of one of the control units, the wheel slip can be determined on two of the axles, which increases safety and simplifies a determination of the respectively remaining wheel slip. In addition, a consideration of a wheel contact force is improved, particularly provided it is used to determine the respective wheel slip.

In a further alternative, the first rotational speed sensor and the third rotational speed are assigned to different sides and different axles of the motor vehicle. For example, the first rotational speed sensor is assigned to a left front wheel and the third rotational speed sensor is assigned to a rear right wheel. Consequently, the second rotational speed sensor and the fourth rotational speed sensor are also assigned to different axles and different sides of the motor vehicle. Based on such a cross-over arrangement, in the event of failure of one of the control units, there is, however, a sensor signal available for each of the axles and each of the sides of the motor vehicle, which improves a determination of the remaining wheel slips and consequently increases safety.

The motor vehicle has a first wheel and a second wheel, expediently a third wheel and a fourth wheel. By means of the wheels, there is particularly contact with an environment, expediently the ground. The motor vehicle is land-based and preferably was moved independently of rails or the like. For example, the motor vehicle is a passenger car or a commercial vehicle, such as a tractor-trailer or bus. In particular, the motor vehicle is suitable, particularly provided and configured, to be moved autonomously, particularly in an automated manner, wherein preferably a level of automation greater than 3 is achieved. The motor vehicle comprises an assistance system with a first control unit and with a second control unit. A first rotational speed sensor for recording a rotational speed of the first wheel is connected to the first control unit, and a second rotational speed sensor for recording a rotational speed of the second wheel is connected to the second control unit. The first control unit is coupled to the second control unit using signal technology.

The assistance system is operated according to a method, in which a first sensor signal is created by means of the first rotational speed sensor and a second sensor signal is created by means of the second rotational speed sensor, and in which it is determined whether a fault of the first control unit or of the second control unit is present. If no fault is present, the second sensor signal is routed to the first control unit by means of the second control unit, and a wheel slip of the first wheel is determined from the first sensor signal by means of the first control unit and a wheel slip of the second wheel is determined from the second sensor signal. If a fault of the first control unit is present, the wheel slip of the first wheel is determined by means of the second control unit using the second sensor signal, and the wheel slip of the second wheel is determined from the second sensor signal. If a fault of the second control unit is present, the wheel slip of the first wheel is determined from the first sensor signal by means of the first control unit, and the wheel slip of the second wheel is determined using the first sensor signal.

The assistance system is suitable, particularly provided and configured, to implement the method. To do this, the assistance system expediently has a suitable control unit, by means of which the method steps are implemented. As an alternative to this, the method is implemented by means of the first and/or the second control unit.

Preferably, the motor vehicle comprises a braking system, which is, for example, a mechanically decoupled braking system. It comprises a brake or at least an actuation line for brake. Preferably, the braking system comprises a disc brake or a drum brake. Alternatively, the brake is an electromotive brake, that is particularly a generator and/or recuperator. Especially preferably, the braking system has a number of such brakes, wherein suitably a brake is assigned to each wheel of the motor vehicle. Suitably, the braking system is controlled/regulated by means of the assistance system. In this case, particularly the respective wheel slip is used as the input variables for the braking system. As an alternative to this, the assistance system is expediently a component of the braking system.

The advantages and further embodiments described in connection with the method should be transferable accordingly as well to the assistance system/motor vehicle and vice versa.

BRIEF DESCRIPTION OF THE DRAWINGS

In the following, exemplary embodiments of the invention are explained in greater detail by means of figures. The following is shown.

DETAILED DESCRIPTION

Parts corresponding to one another have the same reference numbers in all figures.

Figure 1:
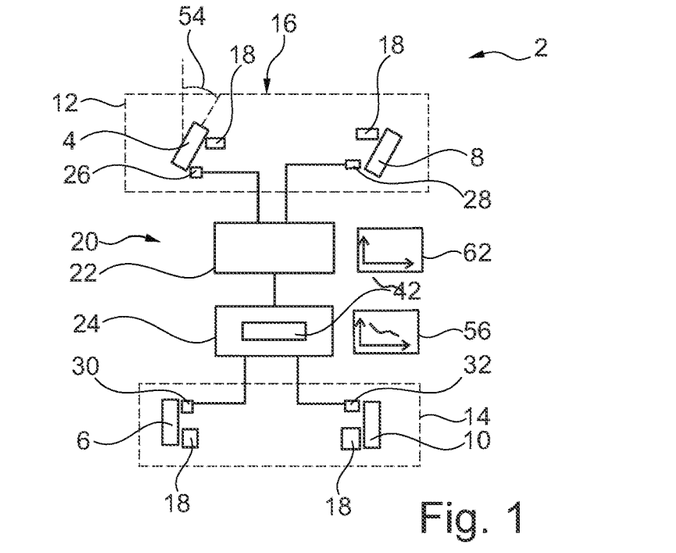
FIG. 1 a motor vehicle with an assistance system, which has a first control unit and a second control unit, simplified schematically.

FIG. 1 shows, schematically simplified, a motor vehicle 2 with a first wheel, a second wheel 6, a third wheel 8, and a fourth wheel 10. The first wheel 4 and the third wheel 8 are assigned to a front axle 12, and the second wheel 6 and the fourth wheel 10 are assigned to a rear axle 14. The motor vehicle 2 only has these two axles, 12 and 14, and is a passenger car.

Furthermore, the motor vehicle 2 has a braking system 16 with four brakes 18, wherein one of the brakes 18 is assigned to each of the wheels 4, 6, 8, 10. With a corresponding actuation, a rotational speed of the respective wheel 4, 6, 8, 10 is reduced or may be locked by means of the brakes 18. In addition, the braking system 16 has an assistance system 20, which is used to determine a wheel slip of the first, second, third, and fourth wheel 4, 6, 8, 10. The assistance system 20 has a first control unit 22 and a second control unit 24, which are coupled to one another using signal technology.

Furthermore, the assistance system 20 has a first rotational speed sensor 26, which is used to record the rotational speed of the first wheel 4, and which is connected to the first control unit 22. Furthermore, the assistance system 20 comprises a third rotational speed sensor 28, which is used to record the rotational speed of the third wheel 8, and which is likewise connected to the first control unit 22. Thus, the first rotational speed sensor 26 and the third rotational speed sensor 28 are coupled directly to the first control unit 22 using signal technology. The assistance system 20 additionally comprises a second rotational speed sensor 30, which is used to record the rotational speed of the second wheel 6, and which is connected to the second control unit 24. In addition, the assistance system 20 comprises a fourth rotational speed sensor 32, which is used to record the rotational speed of the fourth wheel 10, and which is connected to the second control unit 24. The rotational speed sensors 26, 28, 30, 32 are structurally identical to one another and coupled to the respective wheel 4, 6, 8, 10. Based on the arrangement, the first rotational speed sensor 26 and the third rotational speed sensor 28 are assigned to a common axle, namely the front axle 12 of the motor vehicle 2.

Figure 2:
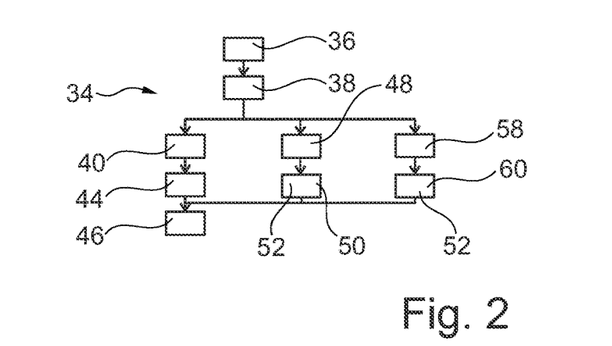
FIG. 2 a method for operating the assistance system.

The assistance system 20 is operated according to a method 34, which is shown in FIG. 2. In a first work step 36, a first sensor signal is created by means of the first rotational speed sensor 26 and a third sensor signal is created by means of the third rotational speed sensor 28. Based on the connection to the first control unit 22, the sensor signals are routed to the first control unit 22 and are thus available there. Furthermore, a second sensor signal is created by means of the second rotational speed sensor 30 and a fourth sensor signal is created by means of the fourth rotational speed sensor 32, which, based on the coupling to the second control unit 24 using signal technology, are available there. The sensor signals correspond to the rotational speed of the respective wheel 4, 6, 8, 10.

In a subsequent second work step 38, it is determined whether a fault of the first control unit 22 or of the second control unit 24 is present. Particularly in this case, there is a check to determine whether the respective control unit 22, 24 is functioning properly.

If no fault is present, the second sensor signal and the fourth sensor signal are routed to the first control unit 22 by means of the second control unit 24, in a third work step 40. To do this, a transmission unit 42 is used, which is designed as an ASIC. Thus, all four sensor signals are available in the first control unit 22.

In a subsequent fourth work step 44, a wheel slip of the first wheel 4 is determined from the first sensor signal by means of the first control unit 22, and a wheel slip of the second wheel 6 is determined from the second sensor signal, as well as a wheel slip of the third wheel 8 is determined from the third sensor signal, and a wheel slip of the fourth wheel 10 is determined from the fourth sensor signal. In this process, a direct determination of the respective wheel slip is essentially implemented by means of the measured sensor signals. In other words, the corresponding sensor signals are suitably evaluated and the respective wheel slip is read off of this.

In a subsequent fifth work step 46, a first braking signal for the first wheel 4 is created by means of the wheel slip of the first wheel 4, and a second braking signal for the second wheel 6 is created by means of the wheel slip of the second wheel 6, as well as a third braking signal for the third wheel 8 is created by means of the wheel slip of the third wheel 8, and a braking signal for the fourth wheel 10 is created also by means of the wheel slip of the fourth wheel 10. For example, previously existing braking signals are modified, or the respective braking signals are re-created. Following this, there is an actuation of each of the brakes 18 with the respective braking signal. In this process, particularly in the event of locking of the respective wheel 4, 6, 8, 10, the respective brake 18 is engaged such that the locking is suspended.

If a fault of the first control unit 22 is present, a determination of the wheel slip is no longer possible by means of the first control unit 22. In this case, after the second work step 38, a sixth work step 48 is implemented and the wheel slip of the second wheel 6 is determined from the second sensor signal by means of the second control unit 24, and the wheel slip of the fourth wheel 10 is determined from the fourth sensor signal. The respective, directly measured sensor signals are used for this. Furthermore, a yaw rate of the motor vehicle 2 is recorded in a seventh work step 50. This substantially corresponds to a movement of the motor vehicle 2 perpendicular to its alignment. A suitable acceleration sensor is used for this. A steering angle 54 of the motor vehicle 2 is also recorded. In addition, a wheel contact force, that is a wheel load, of the first wheel 4 as well as of the third wheel 8 is recorded. A suitable sensor, particularly an acceleration sensor, is used for this.

By means of a characteristic diagram 56, which is stored in the second control unit 24, the wheel slip of the first wheel 4 and the wheel slip of the third wheel 8 are determined by means of the second sensor signal and the fourth sensor signal. The wheel slip of the first wheel 4 is stored, in the characteristic diagram 56 of the second control unit 24, as a function of its wheel contact force, the yaw rate, and the steering angle 54, and as a function of the second and fourth sensor signal. The wheel slip of the third wheel 8 is also stored as a function of its wheel contact force, the yaw rate, and the steering angle 54, and as a function of the second and fourth sensor signal. Thus, after the seventh work step 50, the wheel slips for all wheels 4, 6, 8, 10 are, in turn, known, wherein two of the wheel slips, namely that of the second wheel 6 and of the fourth wheel 10, are measured directly, and wherein two of the wheel slips, namely that of the first wheel 4 and of the second wheel 8 are determined by means of the characteristic diagram 56. Following this, the fifth work step 46 is executed and the braking signals are created and the brakes 18 are suitably actuated.

In the event of a fault of the second control unit 24, an eighth work step 58 is executed, following the second work step 38, and the wheel slip of the first wheel 4 is determined from the first sensor signal and the wheel slip of the third wheel 8 is determined from the third sensor signal by means of the first control unit 22. In addition, a ninth work step 60 is executed, and the wheel slip of the second wheel 6 is determined by means of the first sensor signal and the third sensor signal, for which a characteristic diagram 62 of the first control unit 22 is used. The wheel slip of the second wheel 6 is stored in the characteristic diagram 62 of the first control unit 22 as a function of the yaw rate 52, the steering angle 54, the wheel contact force of the second wheel 6, as well as of the first sensor signal and of the third sensor signal. In addition, the wheel slip of the fourth wheel 10 is determined by means of the characteristic diagram 62 of the first control unit 22, in which additionally the wheel slip of the fourth wheel 10 is stored as a function of the yaw rate 52, the steering angle 54, the wheel contact force of the fourth wheel 4, that is the wheel load of the fourth wheel, as well as of the first and the third sensor signal. Thus, the wheel slips for all wheels 4, 6, 8, 10 are, in turn, known. Following this, the third work step 40 is executed and the braking signals for actuating the respective brake 18 are created and the brakes 18 are actuated accordingly.

Figure 3:
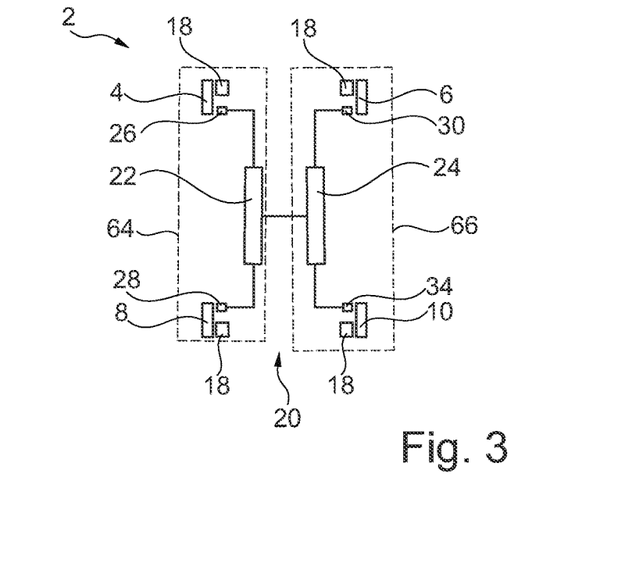
FIG. 3 an alternative embodiment of the assistance system according to FIG. 1.

FIG. 3 shows a modification of the motor vehicle 2, wherein the assistance system 20 has been modified. In contrast, the first wheel 4 as well as the third wheel 8 are assigned to a driver's side 64 of the motor vehicle 2. Thus, the first rotational speed sensor 26 and the third rotational speed sensor 28 are assigned to the driver's side 64. The second wheel 6 and the fourth wheel 10 as well as the second rotational speed sensor 30 and the fourth rotational speed sensor 34 are assigned to a front passenger's side 66 of the motor vehicle 2. The method 34 is likewise implemented in this case during operation. In an embodiment, which is not shown in more detail, the first wheel 4 is assigned to the driver's side 64 as well as to the front axle 12, and the third wheel 8 is assigned to the front passenger's side 66 as well as to the rear axle 14, wherein the rotational speed sensors 26, 28, 30, 32 are arranged accordingly.

In summary, the rotational speed sensors 26, 28, 30, 32, that is the wheel rotational speed sensors, are connected to one of the control units 20, 24 in pairs. Thus, particularly the rotational speed sensors 26, 28 assigned to the front axle 12 are connected to the first control unit 22, and the rotational speed sensors 30, 32 assigned to the rear axle 14 are connected to the second control unit 24. In the fault-free state, the sensor signals are forwarded to the first control unit 22 by the second control unit 24, for which particularly a transmission line circuit designed as an ASIC, that is as a transmission unit 42, is used. Thus, the first control unit 22 has all four sensor signals.

In the event of a fault however, not all of the sensor signals will still be available. In the event of failure of the second control unit 24, only the first and the third sensor signal, that is the wheel rotational speed signals of the front axle 12, are available in the first control unit 22. Regulation of the wheel slip of the front axle 12 takes place in this case by means of the wheel rotational speed signals of the front axle 12, that is of the first and/or of the third sensor signal. In other words, the wheel slip of the first wheel 4 and of the third wheel 8 is determined. The wheel slip on the rear axle 14, that is the one of the second wheel 6 as well as of the fourth wheel 10, is determined by means of the wheel slip of the front axle 12, particularly by means of the first as well as of the third sensor signal, by means of the respective wheel contact force of the rear axle 14, that is the wheel load of the second as well as of the fourth wheel 6, 10, as well as by means of further vehicle geometry data, such as particularly of the yaw rate 52 and of the steering angle 54, for which the characteristic diagram 62 is used. Creation of the braking signals and regulation of the brake 18 takes place accordingly.

In the event of failure of the first control unit 22 and thus failure of the sensor signals of the front axle 12, regulation of the wheel slip, that is particularly the determination of the wheel slip of the first wheel 4 as well as of the third wheel 8, takes place accordingly. Based on the method 34, redundant regulation of the wheel slip by means of the control units 22, 24 is provided with corresponding performance and longitudinal stability, wherein the production costs are reduced. In a further alternative, the first rotational speed sensor 26 is always assigned to the front axle 12 as well as to the driver's side 64, wherein, for example, the third rotational speed sensor 28 is likewise assigned to the driver's side 64 or the front passenger's side 26, that is to the rear axle 14.

The invention is not limited to the previously described exemplary embodiments. Rather, there may be other variants of the invention one skilled in the art may derive without going beyond the subject matter of the invention. In particular, all of the individual features described in connection with the individual exemplary embodiment may additionally be combined with one another in another fashion without going beyond the subject matter of the invention.

The invention claimed is:

1. A method for operating an assistance system of a motor vehicle comprising:
   provision of a first control unit and a second control unit, wherein a first rotational speed sensor is directly connected to the first control unit and records a rotational speed of a first wheel, wherein a second rotational speed sensor is directly connected to the second control unit and records a rotational speed of a second wheel, and wherein the first control unit is coupled to the second control unit using signal technology,
   generation of a first sensor signal is by means of the first rotational speed sensor and generation of a second sensor signal by means of the second rotational speed sensor, and
   determination whether a fault of the first control unit or of the second control unit is present, wherein:
   if no fault is present, the second sensor signal is routed to the first control unit by means of the second control unit, and the first control unit determines a wheel slip of the first wheel from the first sensor signal and a wheel slip of the second wheel from the second sensor signal;
   if a fault of the first control unit is present and communication between the first rotational speed sensor and the second control unit is thereby interrupted, the wheel slip of the first wheel and the wheel slip of the second wheel are both determined by means of the second control unit based on the second sensor signal; and
   if a fault of the second control unit is present and communication between the second rotational speed sensor and the first control unit is thereby interrupted, the wheel slip of the first wheel and the wheel slip of the second wheel are both determined by means of the first control unit based on the first sensor signal.

2. The method according to claim 1, wherein the determination of the wheel slip takes place by means of a characteristic diagram.

3. The method according to claim 1, wherein the wheel slip is determined based on a corresponding wheel load measured by a weight sensor.

4. The method according to claim 3, wherein the wheel slip is determined based further on a yaw rate and a steering angle of the motor vehicle.

5. The method according to claim 1, wherein a first braking signal for the first wheel is created by means of the wheel slip of the first wheel and a second braking signal for the second wheel is created by means of the wheel slip of the second wheel.

6. The method according to claim 1, wherein a third rotational speed sensor is directly connected to the first control unit for recording a rotational speed of a third wheel and generating a third sensor signal,
   wherein a fourth rotational speed sensor is directly connected to the second control unit for recording a rotational speed of a fourth wheel and generating a fourth sensor signal,
   wherein, if the fault of the first control unit is present and communication between the first and third rotational speed sensors and the second control unit is thereby interrupted, the wheel slip of the first, second, third, and fourth wheels are determined by means of the second control unit based on the second and fourth sensor signals, and
   wherein, if the fault of the second control unit is present and communication between the second and fourth rotational speed sensors and the second control unit is thereby interrupted, the wheel slip of the first, second, third, and fourth wheels are determined by means of the first control unit based on the first and third sensor signals.

7. The method according to claim 2, wherein a first braking signal for the first wheel is created by means of the wheel slip of the first wheel and a second braking signal for the second wheel is created by means of the wheel slip of the second wheel.

8. The method according to claim 3, wherein a first braking signal for the first wheel is created by means of the wheel slip of the first wheel and a second braking signal for the second wheel is created by means of the wheel slip of the second wheel.

9. The method according to claim 4, wherein a first braking signal for the first wheel is created by means of the wheel slip of the first wheel and a second braking signal for the second wheel is created by means of the wheel slip of the second wheel.

10. The method according to claim 2, wherein a third rotational speed sensor is directly connected to the first control unit for recording a rotational speed of a third wheel and generating a third sensor signal,
- wherein a fourth rotational speed sensor is directly connected to the second control unit for recording a rotational speed of a fourth wheel and generating a fourth sensor signal,
- wherein, if the fault of the first control unit is present and communication between the first and third rotational speed sensors and the second control unit is thereby interrupted, the wheel slip of the first, second, third, and fourth wheels are determined by means of the second control unit based on the second and fourth sensor signals, and
- wherein, if the fault of the second control unit is present and communication between the second and fourth rotational speed sensors and the second control unit is thereby interrupted, the wheel slip of the first, second, third, and fourth wheels are determined by means of the first control unit based on the first and third sensor signals.

11. The method according to claim 3, wherein a third rotational speed sensor is directly connected to the first control unit for recording a rotational speed of a third wheel and generating a third sensor signal,
- wherein a fourth rotational speed sensor is directly connected to the second control unit for recording a rotational speed of a fourth wheel and generating a fourth sensor signal,
- wherein, if the fault of the first control unit is present and communication between the first and third rotational speed sensors and the second control unit is thereby interrupted, the wheel slip of the first, second, third, and fourth wheels are determined by means of the second control unit based on the second and fourth sensor signals, and
- wherein, if the fault of the second control unit is present and communication between the second and fourth rotational speed sensors and the second control unit is thereby interrupted, the wheel slip of the first, second, third, and fourth wheels are determined by means of the first control unit based on the first and third sensor signals.

12. The method according to claim 4, wherein a third rotational speed sensor is directly connected to the first control unit for recording a rotational speed of a third wheel and generating a third sensor signal,
- wherein a fourth rotational speed sensor is directly connected to the second control unit for recording a rotational speed of a fourth wheel and generating a fourth sensor signal,
- wherein, if the fault of the first control unit is present and communication between the first and third rotational speed sensors and the second control unit is thereby interrupted, the wheel slip of the first, second, third, and fourth wheels are determined by means of the second control unit based on the second and fourth sensor signals, and
- wherein, if the fault of the second control unit is present and communication between the second and fourth rotational speed sensors and the second control unit is thereby interrupted, the wheel slip of the first, second, third, and fourth wheels are determined by means of the first control unit based on the first and third sensor signals.

13. The method according to claim 1, wherein the first control unit is designed to have greater computational capacity than that of the second control unit.

14. An assistance system of a motor vehicle comprising:
a first control unit and a second control unit,
- wherein a first rotational speed sensor is directly connected to the first control unit, records a rotational speed of a first wheel, and generates a first sensor signal
- wherein a second rotational speed sensor is directly connected to the second control unit, records a rotational speed of a second wheel, and generates a second sensor signal,
- wherein the first control unit is coupled to the second control unit using signal technology,
- wherein, if no fault of the first and second control units is present, the second control unit is configured to route the second sensor signal to the first control unit, and the first control unit is configured to determine a wheels slip of the first wheel based on the first sensor signal and to determine a wheel slip of the second wheel based on the second sensor signal,
- wherein, if a fault of the first control unit is present and communication between the first rotational speed sensor and the second control unit is thereby interrupted, the second control unit is configured to determine both the wheel slip of the first wheel and the wheel slip of the second wheel based on the second sensor signal, and
- wherein, if a fault of the second control unit is present and communication between the second rotational speed sensor and the first control unit is thereby interrupted, the first control unit is configured to determine both the wheels slip of the first wheel and the wheel slip of the second wheel based on the first sensor signal.

15. The assistance system according to claim 14, wherein a third rotational speed sensor is directly connected to the first control unit, records a rotational speed of a third wheel, and generates a third sensor signal,
- wherein a fourth rotational speed sensor is directly connected to the second control unit, records a rotational speed of a fourth wheel, and generates a fourth sensor signal,
- wherein, if the fault of the first control unit is present and communication between the first and third rotational speed sensors and the second control unit is thereby interrupted, the second control unit is configured to determine the wheel slip of the first, second, third, and fourth wheels based on the second and fourth sensor signals, and
- wherein, if the fault of the second control unit is present and communication between the second and fourth rotational speed sensors and the second control unit is thereby interrupted, the first control unit is configured to determine the wheel slip of the first, second, third, and fourth wheels based on the first and third sensor signals.

16. The assistance system according to claim 15, wherein the first rotational speed sensor and the third rotational speed sensor are assigned to a common axle of the motor vehicle.

17. The assistance system according to claim 15, wherein the first rotational speed sensor and the third rotational speed sensor are assigned to different axles of the motor vehicle.

18. The method according to claim 5, wherein a third rotational speed sensor is directly connected to the first control unit for recording a rotational speed of a third wheel and generating a third sensor signal, wherein a fourth rotational speed sensor is directly connected to the second control unit for recording a rotational speed of a fourth wheel and generating a fourth sensor signal, wherein, if the fault of the first control unit is present and communication between the first and third rotational speed sensors and the second control unit is thereby interrupted, the wheel slip of the first, second, third, and fourth wheels are determined by means of the second control unit based on the second and fourth sensor signals, and wherein, if the fault of the second control unit is present and communication between the second and fourth rotational speed sensors and the second control unit is thereby interrupted, the wheel slip of the first, second, third, and fourth wheels are determined by means of the first control unit based on the first and third sensor signals.

19. The assistance system according to claim 14, wherein the first rotational speed sensor and the third rotational speed sensor are assigned to a common axle of the motor vehicle.

20. The assistance system according to claim 14, wherein the first rotational speed sensor and the third rotational speed sensor are assigned to different axles of the motor vehicle.

* * * * *